(12) United States Patent
Roh

(10) Patent No.: US 7,397,020 B2
(45) Date of Patent: Jul. 8, 2008

(54) IMAGE SENSOR USING A BOOSTED VOLTAGE AND A METHOD THEREOF

(75) Inventor: Jae-seob Roh, Anyang-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 86 days.

(21) Appl. No.: 11/430,093

(22) Filed: May 9, 2006

(65) Prior Publication Data

US 2007/0008420 A1    Jan. 11, 2007

(30) Foreign Application Priority Data

Jul. 7, 2005    (KR) .................... 10-2005-0061242

(51) Int. Cl.
*H01L 27/00* (2006.01)
*H04N 3/14* (2006.01)

(52) U.S. Cl. ............... 250/208.1; 250/214 R; 348/303; 348/308

(58) Field of Classification Search ............. 250/208.1, 250/214 R, 214 C, 214 SW; 348/294, 302–310
See application file for complete search history.

(56) References Cited

U.S. PATENT DOCUMENTS 6,556,066 B2    4/2003    Sato 6,798,274 B2    9/2004    Tanimoto
7,129,985 B1 *  10/2006   Koizumi et al. ............. 348/372
2006/0092316 A1 * 5/2006  Gazeley ...................... 348/372

FOREIGN PATENT DOCUMENTS

JP    09-163247    6/1997

* cited by examiner

*Primary Examiner*—Kevin Pyo
(74) *Attorney, Agent, or Firm*—Harness, Dickey & Pierce, P.L.C.

(57) ABSTRACT

An image sensor and method thereof. In an example, the image sensor, may include a pixel array including a plurality of unit pixels, each of the plurality of unit pixels having a charge transfer unit for transferring charges accumulated in an optoelectronic converter to a charge detector via a charge transfer driving signal. The example image sensor may further include a row driving unit generating a boosted voltage, the boosted voltage set to a boosted voltage level higher than a power voltage level, the boosted voltage selectively boosted in response to a boosting voltage variable control signal. The row driving unit may selectively apply the charge transfer driving signal to the pixel array. In another example, the method may include selectively adjusting a voltage level of a charge transfer driving voltage and transferring the charge transfer driving voltage to a charge transfer unit for controlling an operation of the charge transfer unit.

24 Claims, 9 Drawing Sheets

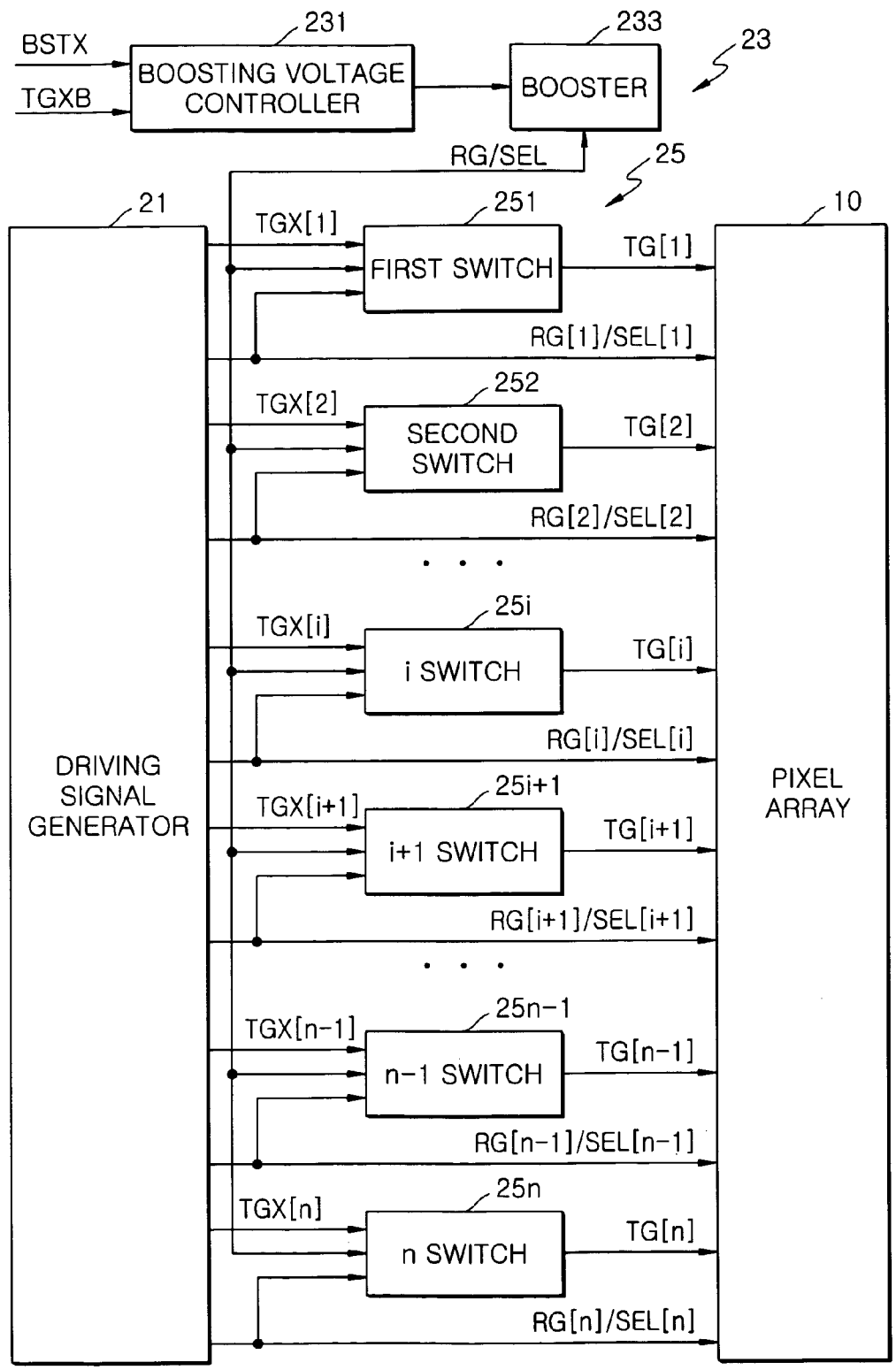

FIG. 4
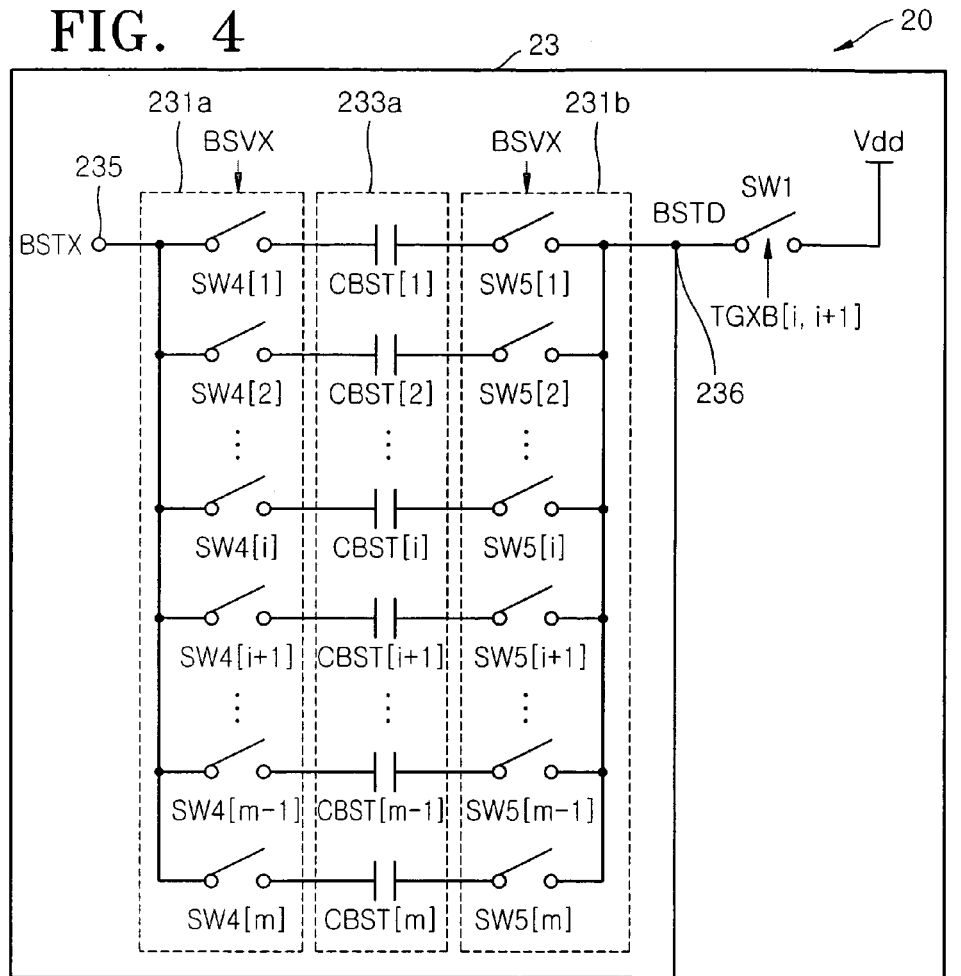
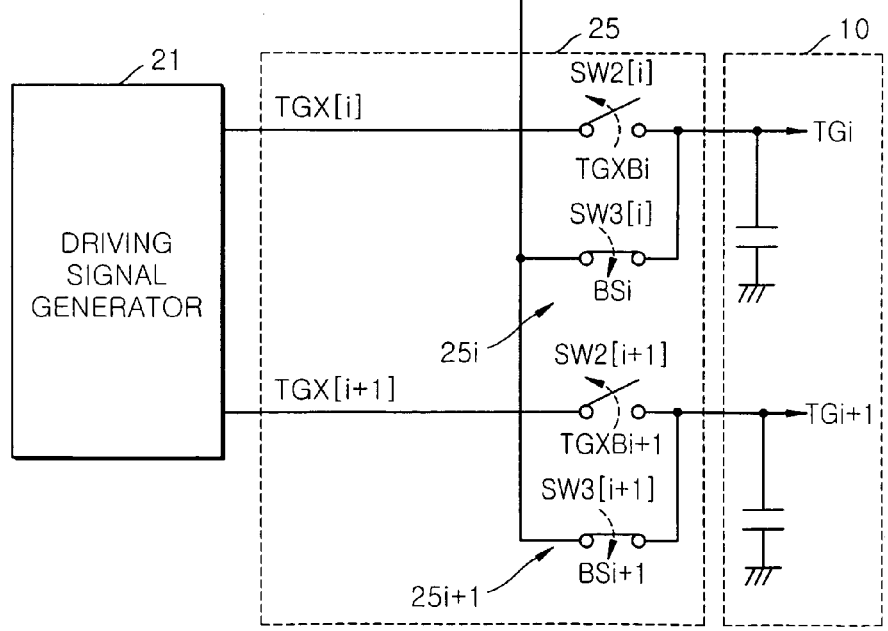

IMAGE SENSOR USING A BOOSTED VOLTAGE AND A METHOD THEREOF

PRIORITY STATEMENT

This application claims the benefit of priority under 35 USC § 119 from Korean Patent Application No. 10-2005-0061242, filed on Jul. 7, 2005, in the Korean Intellectual Property Office, the contents of which is incorporated herein by reference in its entirety.

BACKGROUND OF THE INVENTION

1. Field of the Invention

Example embodiments of the present invention relate generally to a semiconductor device and method thereof, and more particularly to an image sensor and method thereof.

2. Description of the Related Art

Image sensors may be devices capable of converting optical images into electric signals. Image sensors may be deployed in a variety of device types, including but not limited to a digital camera, a camcorder, a personal computer system, a game machine, a security camera, a medical microcamera, a robot, etc.

Conventional image sensors may be classified as charge coupled device (CCD) image sensors or complementary metal oxide semiconductor (CMOS) image sensors. CMOS image sensors may have a relatively simple operational mode and CMOS process technology may be compatible with a fabrication of the CMOS image sensor to reduce a fabrication cost and/or fabrication complexity. In an example, a conventional CMOS image sensor may include four transistors and a photodiode. In an alternative example, three transistors may be included in the CMOS image sensor.

A transistor structure of an image pixel may be fabricated through a CMOS fabrication process. In the CMOS image sensor, if a light is incident on the photodiode, the photodiode may absorb photo energy and may accumulate charges corresponding to a quantity or intensity of the incident light. A charge transfer unit may transfer the charges accumulated at the photodiode to a charge detector. An amplification unit may be combined with a substantially constant current source so as to serve as a source follower buffer amplifier. The amplification unit may output a voltage which may vary in response to an electric potential of the charge detector to a vertical signal line.

As image sensors are fabricated at reduces sizes, it may become more difficult for the charge transfer unit to transfer all of the accumulated charges stored in the photodiode to the charge detector. Charges remaining in the photodiode which may not be transferred to the charge detector may appear as an afterimage during a next read operation, thereby degrading a performance of the image sensor. Further, since the charges generated corresponding to the quantity or intensity of the light may be distributed among the charge detector as well as the photodiode (e.g., instead of a complete transfer), a conversion gain corresponding to the charges generated by a photoelectron may decrease. The remaining charges in the photodiode may also effectively reduce a charge accumulation capacity of the photodiode.

SUMMARY OF THE INVENTION

An example embodiment of the present invention is directed to an image sensor, including a pixel array including a plurality of unit pixels, each of the plurality of unit pixels having a charge transfer unit for transferring charges accumulated in an optoelectronic converter to a charge detector via a charge transfer driving signal and a row driving unit generating a boosted voltage, the boosted voltage set to a boosted voltage level higher than a power voltage level, the boosted voltage selectively boosted in response to a boosting voltage variable control signal, and selectively applying the charge transfer driving signal to the pixel array.

Another example embodiment of the present invention is directed to a method of improving a charge transfer in an image device, including selectively adjusting a voltage level of a charge transfer driving voltage and transferring the charge transfer driving voltage to a charge transfer unit for controlling an operation of the charge transfer unit.

Another example embodiment of the present invention may be directed to a complementary metal oxide semiconductor (CMOS) image sensor capable of optimizing or improving a charge transfer by varying a charge transfer driving voltage.

BRIEF DESCRIPTION OF THE DRAWINGS

The accompanying drawings are included to provide a further understanding of example embodiments of the invention, and are incorporated in and constitute a part of this specification. The drawings illustrate example embodiments of the present invention and, together with the description, serve to explain principles of the present invention.

FIG. 3 is a block diagram illustrating a image sensor according to another example embodiment of the present invention.

FIG. 4 is a circuit diagram illustrating a row driving unit according to another example embodiment of the present invention.

DETAILED DESCRIPTION OF EXAMPLE EMBODIMENTS OF THE PRESENT INVENTION

Figure 1:
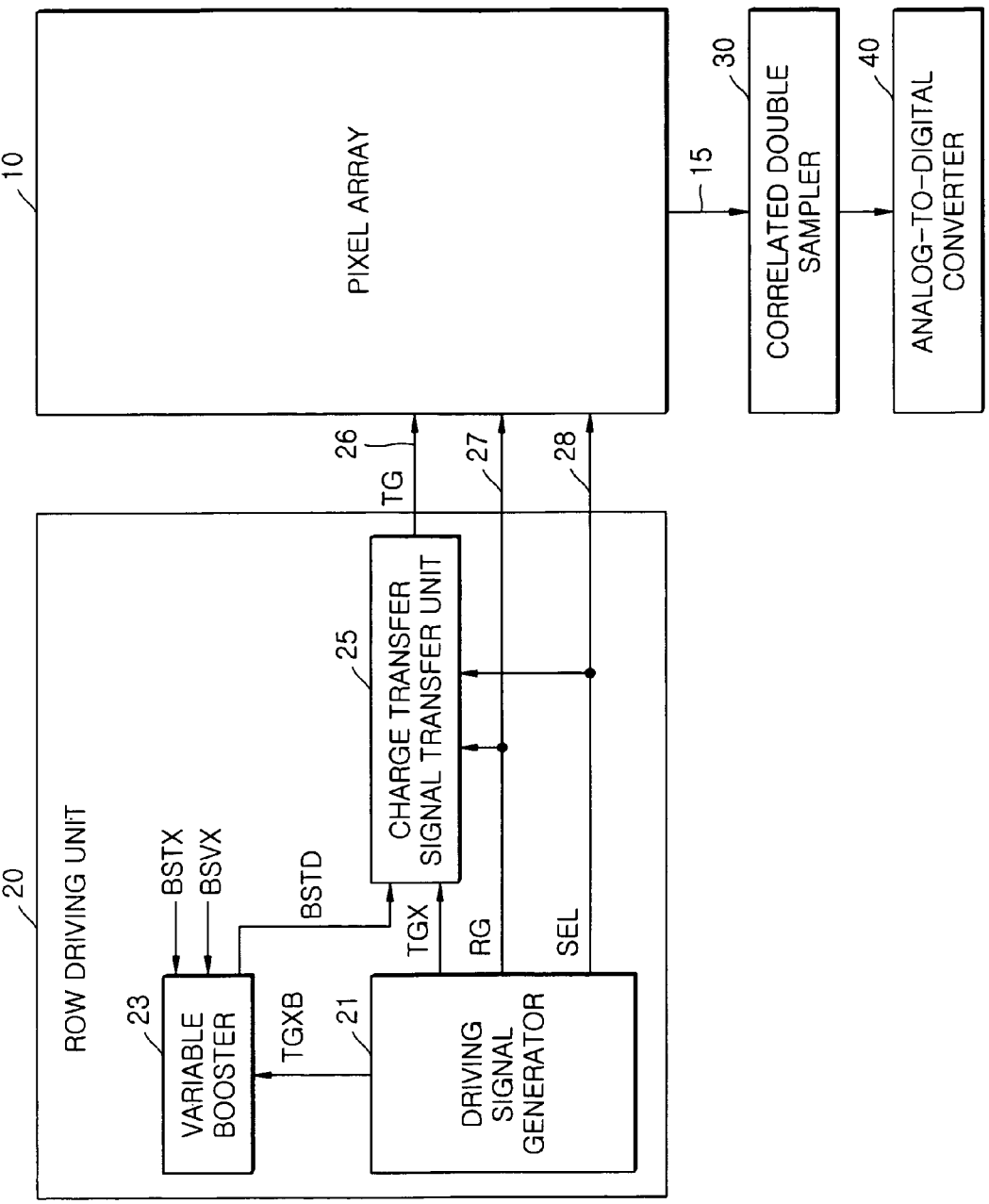
FIG. 1 is a block diagram of an image sensor according to an example embodiment of the present invention.

Detailed illustrative example embodiments of the present invention are disclosed herein. However, specific structural and functional details disclosed herein are merely representative for purposes of describing example embodiments of the present invention. Example embodiments of the present invention may, however, be embodied in many alternate forms and should not be construed as limited to the embodiments set forth herein.

Accordingly, while example embodiments of the invention are susceptible to various modifications and alternative forms, specific embodiments thereof are shown by way of example in the drawings and will herein be described in detail. It should be understood, however, that there is no intent to limit example embodiments of the invention to the particular forms disclosed, but conversely, example embodiments of the invention are to cover all modifications, equivalents, and alternatives falling within the spirit and scope of the invention. Like numbers may refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. Conversely, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of an image sensor according to an example embodiment of the present invention. In the example embodiment of FIG. 1, the image sensor may include a pixel array 10, a row driving unit 20, a correlated double sampler (CDS) 30 and an analog-to-digital converter (ADC) 40. In an example, the pixel array 10 may include a plurality of unit pixels 100 arranged in rows and columns. The plurality of unit pixels 100 arranged in the pixel array 10 may be used to convert an optical image signal into an electric image signal. The electrical image signal converted at the pixel array 10 may be applied to the CDS 30 through a vertical signal line 15. The row driving unit 20 may supply a driving signal to drive the unit pixels 100 (e.g., the pixels arranged in rows).

In the example embodiment of FIG. 1, the CDS 30 may perform a double sampling operation for a reference voltage level (e.g., a noise level) and a signal level (e.g., a voltage level due to the electric signal of the pixel array 10, etc.) and may output a differential voltage level corresponding to a difference between the reference voltage level and the signal level. The CDS 30 may thereby inhibit fixed noise levels incurred by property dispersion of the vertical line 15 and the unit pixel arranged in the pixel array 10.

In the example embodiment of FIG. 1, an amplifier (not shown) may be positioned between the CDS 30 and the ADC 40. The amplifier (not shown) may receive the differential voltage level received from the CDS 30 and may output an analog output signal with a gain (e.g., an amplified version of the differential voltage signal). The ADC 40 may receive the analog output signal and may convert the received analog output signal so as to output a digital output signal for offset compensation. The digital output signal of the ADC 40 may be latched at a latch unit (not shown). The digital output signal latched at the latch unit may be transferred to a multiplexer (not shown). After multiplexing the latched digital output signal supplied from the latch unit, the multiplexer may transfer the multiplexed digital output signal to an image signal processor (not shown).

Figure 2A:
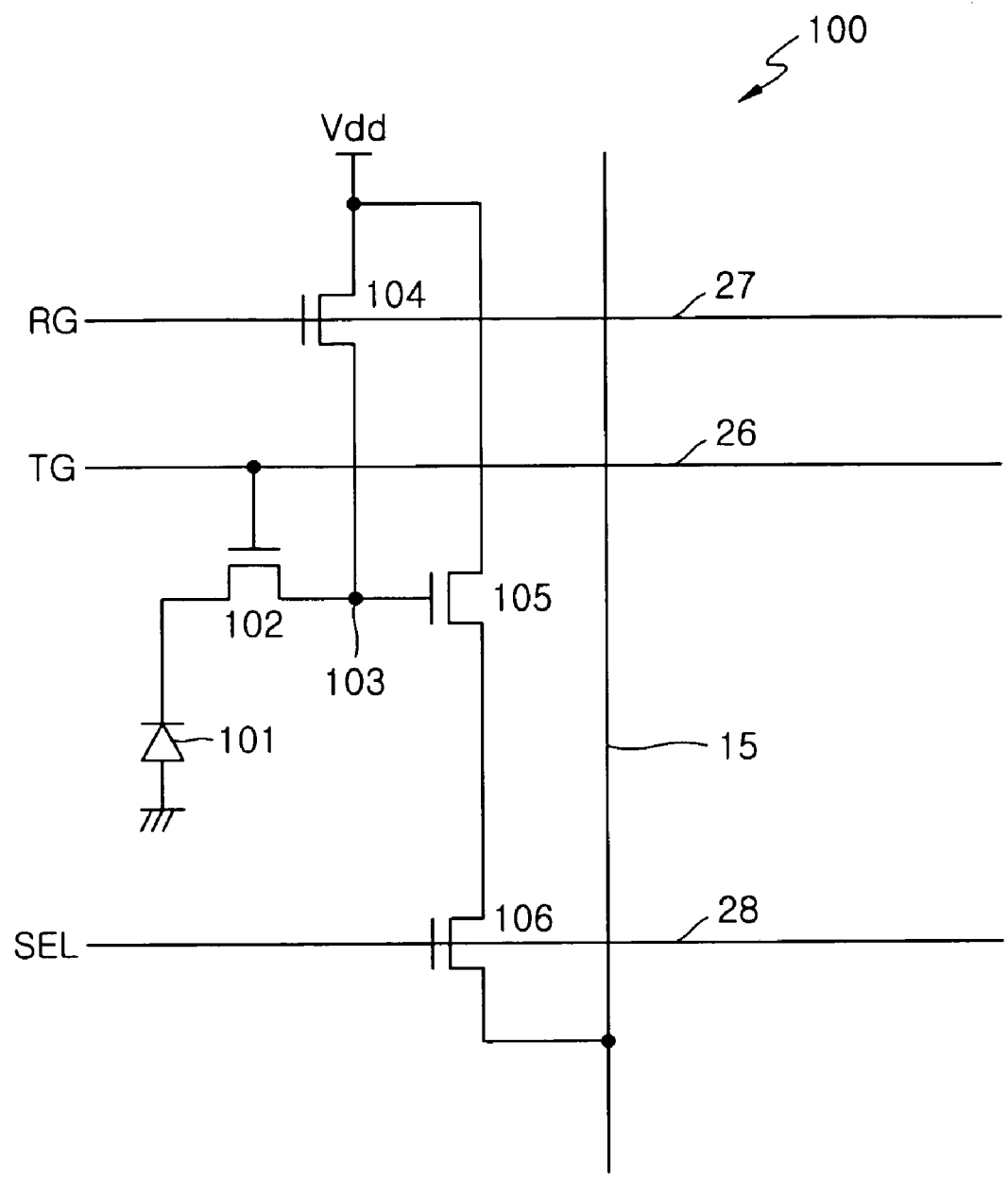
FIG. 2A illustrates a circuit diagram and FIG. 2B illustrates a schematic plane view of a representative unit pixel of a pixel array of the image sensor of FIG. 1.
Figure 2B:
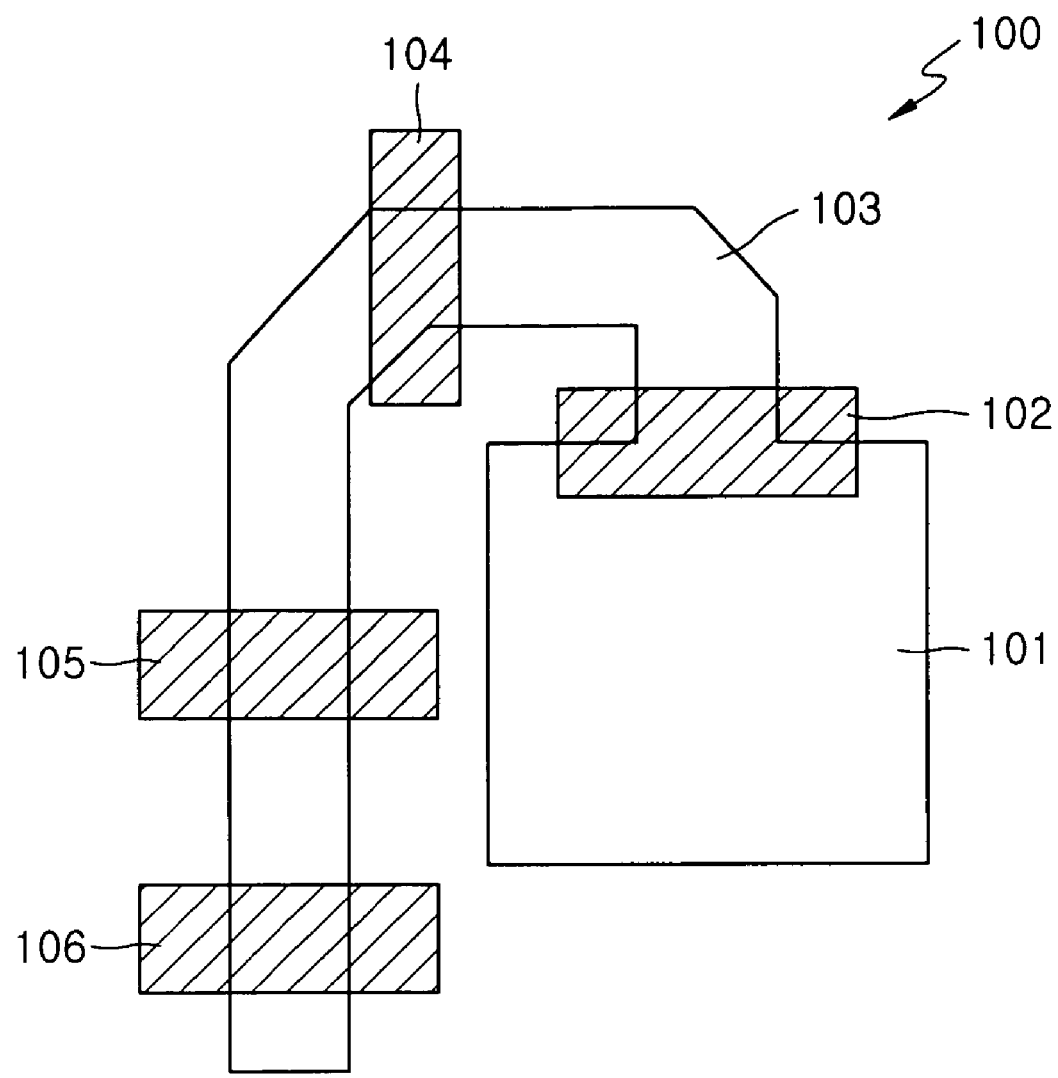

FIG. 2A illustrates a circuit diagram and FIG. 2B illustrates a schematic plane view of a representative unit pixel 100 of the pixel array 10 of the image sensor of FIG. 1.

In the example embodiment of FIGS. 2A and 2B, the unit pixel 100 of the pixel array 10 may include an optoelectronic converter 101, a charge transfer unit 102, a charge detector 103, a reset unit 104, an amplifier 105 and a selector 106. The optoelectronic converter 101 may absorb light with a given photo energy (e.g., reflected from objects in a surrounding environment) and may accumulate charges corresponding to a quantity or intensity of the absorbed light. In an example, the optoelectronic converter 101 may include one or more of a photodiode, a phototransistor, a photogate and a pinned photodiode (PPD). The charges accumulated at the optoelectronic converter 101 may be transferred to a floating diffusion region at the charge detector 103 via the charge transfer unit 102. The charge detector 103 may have a parasitic capacitance, and successively stored charges may accumulate. The charge detector 103 may be connected to the amplifier 105 so as to control the amplifier 105.

In the example embodiment of FIGS. 2A and 2B, the charge transfer unit 102 may transfer the charges stored at the optoelectronic converter 101 to the charge detector 103. In an example, the charge transfer unit 102 may include a transistor, such as an n-type metal oxide semiconductor (NMOS) transistor. A gate of the NMOS transistor may be connected to a charge transfer signal line 26, and a source and a drain of the NMOS transistor may be connected to the charge detector 103 and the optoelectronic converter 101, respectively. The charge transfer unit 102 may be controlled by the charge transfer driving signal TG applied from the drive signal generator 21 of the row driving unit 20. In an example, the charge transfer unit 102 may transfer an entirety of the charges stored at the optoelectronic converter 101 to the charge detector 103. In an alternative example, if less than all of the charges stored at the optoelectronic converter 101 are transferred, remaining charges in the optoelectronic converter 101 may appear as an afterimage during a next read operation, which may decrease a conversion gain and charge accumulation capacity of the optoelectronic converter 101.

In the example embodiment of FIGS. 2A and 2B, in order to reduce (e.g., prevent) an overflow or a blooming phenomenon at the optoelectronic converter 101 that may occur when the light with excessive photo energy is irradiated on, the charge transfer unit 102 may use an enhancement type MOS transistor and/or a depletion type MOS transistor having a lower threshold voltage in place of the NMOS transistor.

Alternatively, in another example, if the CMOS image sensor has an additional overflow path, a conventional enhancement MOS transistor may be used.

In the example embodiment of FIGS. 2A and 2B, a voltage of a node 236 receiving a boosting voltage signal SBTD may be increased or "boosted up" with a variable booster 23 of the row driving unit 20 such that a boosted voltage (e.g., higher than an external power voltage Vdd) may be applied as a charge transfer driving signal TG to the unit pixel 100 of the pixel array 10. If the boosted voltage is used as the charge transfer driving signal TG, an electric potential of the charge transfer unit 102 may be higher as compared to a conventional CMOS image sensor using the external power voltage Vdd as the charge transfer driving signal TG. Also, the electric potential of the charge transfer unit 102 may be higher than that of the optoelectronic converter 101.

In the example embodiment of FIGS. 2A and 2B, the reset unit 104 may reset the charge detector 103 periodically. In an example, the reset unit 104 may include an NMOS transistor. A gate of the NMOS transistor may be connected to a reset signal line 27, and a source and a drain of the NMOS transistor may be connected to the charge detector 103 and the external power voltage Vdd, respectively. The reset unit 104 may be operated by a reset signal RG applied from the driving signal generator 21 of the row driving unit 20.

In the example embodiment of FIGS. 2A and 2B, the amplifier 105 may be combined with a substantially constant current source (not shown) from the pixel array 10 so as to serve as a source follower buffer amplifier. In an example, the amplifier 105 may include an NMOS transistor with a gate connected to the charge detector 103, and a source and a drain of the NMOS transistor may be connected to the selector 106 and the external power voltage Vdd, respectively. The gate of the amplifier 105 may be connected to the charge detector 103 and may output a voltage varying in response to the electric potential of the charge detector 103.

In the example embodiment of FIGS. 2A and 2B, the selector 106 may select the unit pixels 100 which may be read by a row unit among the plurality of the unit pixels 100 arranged in the pixel array 10. In an example, the selector 106 maybe an NMOS transistor. A gate of the NMOS transistor may be connected to a pixel select signal line 28, and a source and a drain of the NMOS transistor may be connected to the vertical signal line 15 and the amplifier 105, respectively. The selector 106 may operate in response to a pixel select signal SEL received from the driving signal generator 21 of the row driving unit 20.

In the example embodiment of FIGS. 2A and 2B, the driving lines 26, 27 and 28 may be extended along a row direction (e.g., a horizontal direction) to allow for a concurrent operation of pixels arranged in the same row among the plurality of the unit pixels 100. The driving line 26 may be the charge transfer driving signal line applying the charge transfer driving signal TG to the charge transfer unit 102 in the unit pixel 100 of the pixel array 10 from the driving signal generator 21. The driving line 27 may be the reset signal line applying the reset signal RG to the reset unit 104 in the unit pixel 100 of the pixel array 10 from the driving signal generator 21. The driving line 28 may be the pixel select signal line applying the pixel select signal SEL to the selector 106 in the unit pixel 100 of the pixel array 10 from the driving signal generator 21.

In the example embodiment of FIGS. 1, 2A and 2B, the row driving unit 20 may include the driving signal generator 21, the variable booster 23 and a charge transfer signal transfer unit 25. The driving signal generator 21 may generate the pixel select signal SEL, the reset signal RG and the charge transfer execution signal TGX by every row. The pixel select signal SEL may be applied to the unit pixel 100 of the pixel array 10 so as to control the selector 106 of the unit pixel 100. In a further example, the pixel select signal SEL may be applied to a selector in a given unit pixel 100 among the plurality of the unit pixels 100 of the pixel array 10 through a given pixel select signal line 28 among the plurality of the pixel select signal lines. For example, the pixel select signal SEL may be applied to the selector in the unit pixel 100 arranged in an ith row through an ith pixel select signal line. The pixel select signal SEL may also be applied to the charge transfer signal transfer unit 25.

In the example embodiment of FIGS. 1, 2A and 2B, the reset signal RG may be applied to the unit pixel 100 of the pixel array 10 to control the reset unit 104 of the unit pixel 100. The reset signal RG may be applied to the reset unit 104 at a given unit pixel 100 among the plurality of the unit pixels 100 of the pixel array 10 through a given reset signal line 27 among the plurality of the reset signal lines. For example, the reset signal RG may be applied to the reset unit 104 in the unit pixel 100 arranged in an ith row through an ith pixel select signal line. In addition, the reset signal RG may also be supplied to the charge transfer signal transfer unit 25. A charge transfer execution signal TGX may be applied to the charge transfer signal transfer unit 25 and may be converted into a charge transfer driving signal TG for controlling the charge transfer unit 102 in the unit pixel 100 of the pixel array 10. An inversion signal (e.g., a charge transfer execution bar signal TGXB) of the charge transfer execution signal TGX may be applied to the variable booster 23.

In the example embodiment of FIGS. 1, 2A and 2B, the variable booster 23 may increase or boost up the voltage of the node 236 (e.g., see FIGS. 4 and 5, described below) varying (e.g., to maintain a desired voltage level) in response to a boosting voltage variable control signal BSVX, a boosting control signal BSTX and the charge transfer execution bar signal TGXB. The charge transfer signal transfer unit 25 may apply the boosted voltage at a voltage level higher than the external power voltage Vdd generated at the variable booster 23 and/or the charge transfer execution signal TGX generated at the driving signal generator 21 as the charge transfer driving signal TG to the charge transfer unit 102 in the unit pixel 100 of the pixel array 10 in response to the charge transfer execution signal TGX, the pixel select signal SEL and the reset signal RG received from the driving signal generator 21.

FIG. 3 is a block diagram illustrating an image sensor (e.g., a CMOS image sensor) according to another example embodiment of the present invention. In particular, a more detailed block diagram of the row driving unit 20 in the image sensor of FIG. 1 is illustrated in FIG. 3.

In the example embodiment of FIG. 3, the variable booster 23 may include a boosting voltage controller 231 and a booster 233. The boosting voltage controller 231 may variably control a voltage level of a given voltage to be boosted up or increased in response to the boosting control signal BSTX and the boosting voltage variable control signal BSVX. In an example, the booster 233 may be used for boosting up the voltage at the node 236 based on the boosted voltage level determined by the boosting voltage controller 231. The booster 233 may boost up the voltage at the node 236 (e.g., to attain or maintain the node 236 voltage at a desired level as determined by the boosting voltage controller 231) and may apply the boosted voltage (e.g., which may be higher than the external power voltage Vdd) to the charge transfer signal transfer unit 25.

In the example embodiment of FIG. 3, the charge transfer signal transfer unit 25 may transfer the boosted voltage received from the variable booster 23 to the charge transfer unit 102 in the unit pixel 100 of the pixel array 10. The boosted voltage may be transferred from the variable booster 23 to the unit pixels 100 to one or more rows of the pixel array 10. The charge transfer signal transfer unit 25 may include a plurality of switch units 251 to 25n. The switch units 251 to 25n of the charge transfer signal transfer unit 25 may apply the charge transfer execution signals TGX[1] to TGX[n] outputted from the driving signal generator 21 as the charge transfer driving signal TGi to the unit pixel 100 of the pixel array 10 in response to the reset signals RG[1] to RG[n] and the pixel select signals SEL[1] to SEL[n] received from the driving signal generator 21. Alternatively, the switch units 251 to 25n may apply the boosted voltage received from the variable booster 23 as the charge transfer driving signal TGi to the pixel array 10 in response to the reset signals RG[1] to RG[n] and the pixel select signals SEL[1] to SEL[n] received from the driving signal generator 21.

FIG. 4 is a circuit diagram illustrating the row driving unit 20 of FIG. 1 according to another example embodiment of the present invention.

In the example embodiment of FIG. 4, an ith switch unit 25i and an i+1th switch unit 25i+1 among the plurality of the switch units 251 to 25n of the charge transfer signal transfer unit 25 may be used for applying the charge transfer driving signal TGi and TGi+1, respectively, to respective unit pixels 100 arranged in an ith row and an ith+1 row of the pixel array 10, respectively.

In the example embodiment of FIGS. 3 and 4, the booster 233 of the variable booster 23 may include a boost capacitor 233a and a first switch SW1. The first switch SW1 may include a first end connected to the node 236 and a second end connected to the external power voltage Vdd. The boost capacitor 233a may include a capacitor group CBST[1] to CBST[n] connected in parallel and disposed between the node 235 where the boosting control signal BSTX may be applied and the node 236 where a boosting voltage signal BSTD may be applied. The first switch SW1 may be controlled by charge transfer execution bar signals TGXB[i] and TGXB[i+1]. The charge transfer execution bar signals TGXB[i] and TGXB[i+1] may denote inverted signals of the charge transfer execution signals TGB[i] and TGX[i+1], respectively. The capacitor group CBST[1] to CBST[m] of the boost capacitor 233a may be selectively connected to the nodes 235 and 236 by the boosting voltage controller 231.

In the example embodiment of FIG. 4, the boosting voltage controller 231 may include a fourth switch 231a connected to the node 235 and a first end of the boost capacitor 233a and a fifth switch 231b connected to the node 236 and a second end of the boost capacitor 233a. The fourth switch 231a may be disposed between the first end of the boost capacitor 233a and the node 235 and the fifth capacitor may be disposed between the second end of the boost capacitor 233a and the node 236. In an example, the fourth switch 231a may include a switch group SW4[1] to SW4[m] connected to the node 235 and a first end of the capacitor group CBST[1] to CBST[m] in parallel, respectively. In another example, the fifth switch 231b may include a switch group SW5[1] to SW5[m] connected to the node 236 and a second end of the capacitor group CBST[1] to CBST[m] in parallel, respectively. The switch group SW4[1] to SW4[m] of the fourth switch 231a and the switch group SW5[1] to SW5[m] of the fifth switch 231b may operate in accordance with the boosted voltage variable control signal BSVX.

In the example embodiment of FIG. 4, the charge transfer signal transfer unit 25 may include a plurality of switch units 25i and 25i+1. In the switch unit 25i, second and third switches SW2[i] and SW3[i] may be controlled by the charge transfer execution bar signal TGXBi and the charge transfer control signal BSi. In the switch unit 25i+1, second and third switches SW2[i+1] and SW3[i+1] may be controlled by the charge transfer execution bar signal TGXBi+1 and the charge transfer control signal BSi+1. The switch units 25i and 25i+1 may apply the charge transfer execution signals TGXi and TGXi+1 or, alternatively, the boosting voltage signal BSTD, as charge transfer signals TGi and TGi+1 to the unit pixel arranged in an ith row and/or an i+1th row of the pixel array 10, respectively. The second switches SW2[i] and SW2[i+1] of each of the switch units 25i and 25i+1 may be controlled by the charge transfer execution bar signals TGXBi and TGXBi+1, respectively, and the third switches SW3[i] and SW3[i+1] may be controlled by the charge transfer control signals BSi and BSi+1, respectively. The charge transfer control signal BSi may be generated in response to the reset signal RGi and the pixel select signal SELi received from the driving signal generator 21.

In the example embodiment of FIG. 4, the capacitor group CBST[1] to CBST[m] of the boost capacitor 233a in the variable booster 23 may be selectively connected to the nodes 235 and 236 by the first and second switches 231a and 231b. In an example, if the first to the ith capacitors CBST[1] to CBST[i] are selected so as to correspond to a boosted voltage level, the switches SW4[1] to SW4[i] may be turned on and the switches SW4[i+1] to SW4[m] may be turned off in the switch group SW4[1] to SW4[m] of the fourth switch 231a. The switches SW5[1] to SW5[i] may be turned on and the others SW5[i+1] to SW5[m] may be turned off in the switch group SW5[1] to SW5[m] of the fifth switch 231b. Accordingly, between the nodes 235 and 236, members of the capacitor group CBST[1] to CBST[i] maybe connected to one another in parallel via the switches SW4[1] to SW4[i] of the fourth switch 231a and the switches SW5[1] to SW5[i] of the fifth switch 231b.

In the example embodiment of FIG. 4, if the charge transfer execution signal TGXi is applied, the first switch SW1 may be turned off by the charge transfer execution bar signal TGXBi and the selected capacitors CBST[1] to CBST[i] may boost up the voltage of the node 236 (e.g., to a desired voltage level) in response to the boosting control signal BSTX. A boosted voltage signal BSTD (e.g., having a voltage level higher than the external power voltage Vdd) may be transferred to the charge transfer signal transfer unit 25.

In the example embodiment of FIG. 4, the charge transfer execution signal TGXi for the unit pixels arranged in the ith row of the pixel array 10 may be applied to the charge transfer signal transfer unit 25 from the driving signal generator 21. In the charge transfer signal transfer unit 25, the second and the third switches SW2[i] and SW3[i] may be controlled by the charge transfer execution bar signal TGXBi and the charge transfer control signal BSi. Therefore, the charge transfer signal transfer unit 25 may apply the charge transfer execution signal TGXi and the boosting voltage signal BSTD to the unit pixel arranged in the ith row of the pixel array 10 as the charge transfer driving signal TGi. In an example, if the switch SW2[i] is controlled by the charge transfer execution bar signal TGXBi, the charge transfer execution signal TGXi of the driving signal generator 21 may be applied as the charge transfer driving signal TGi. In another example, if the switch SW3[i] is controlled by the charge transfer control signal BSi, the boosting voltage signal BSTD of the variable booster 23 may be applied as the charge transfer driving signal TGi.

In the example embodiment of FIG. 4, each of the capacitors CBST[1] to the CBST [m] of the boost capacitor 233a may have substantially the same capacitance. In an example, the capacitance of the capacitors CBST[1] to the CBST [m] of the boost capacitor 233a may be higher than a capacitance of a load capacitor (e.g., see CTGi in FIG. 5) of the pixel array 10. In an example, the capacitance of each of the capacitors CBST[1] to the CBST [m] may be approximately twice that of the load capacitor CTGi of the pixel array 10. In another example, the capacitance of each of the capacitors CBST[1] to the CBST [m] may be 10 or more times larger than that of the load capacitor CTGi in the pixel array 10.

In an alternative example embodiment of the present invention, referring to FIG. 4, the capacitance of one or more of the capacitors CBST[1] to the CBST [m] may be different from one another, and the boosting voltage level may be controlled with a selected combination of the capacitors from the capacitor group CBST[1] to the CBST [m]. In an example, a number of the selected capacitors from the capacitor group CBST[1] to the CBST [m] may be one or more.

Figure 5:
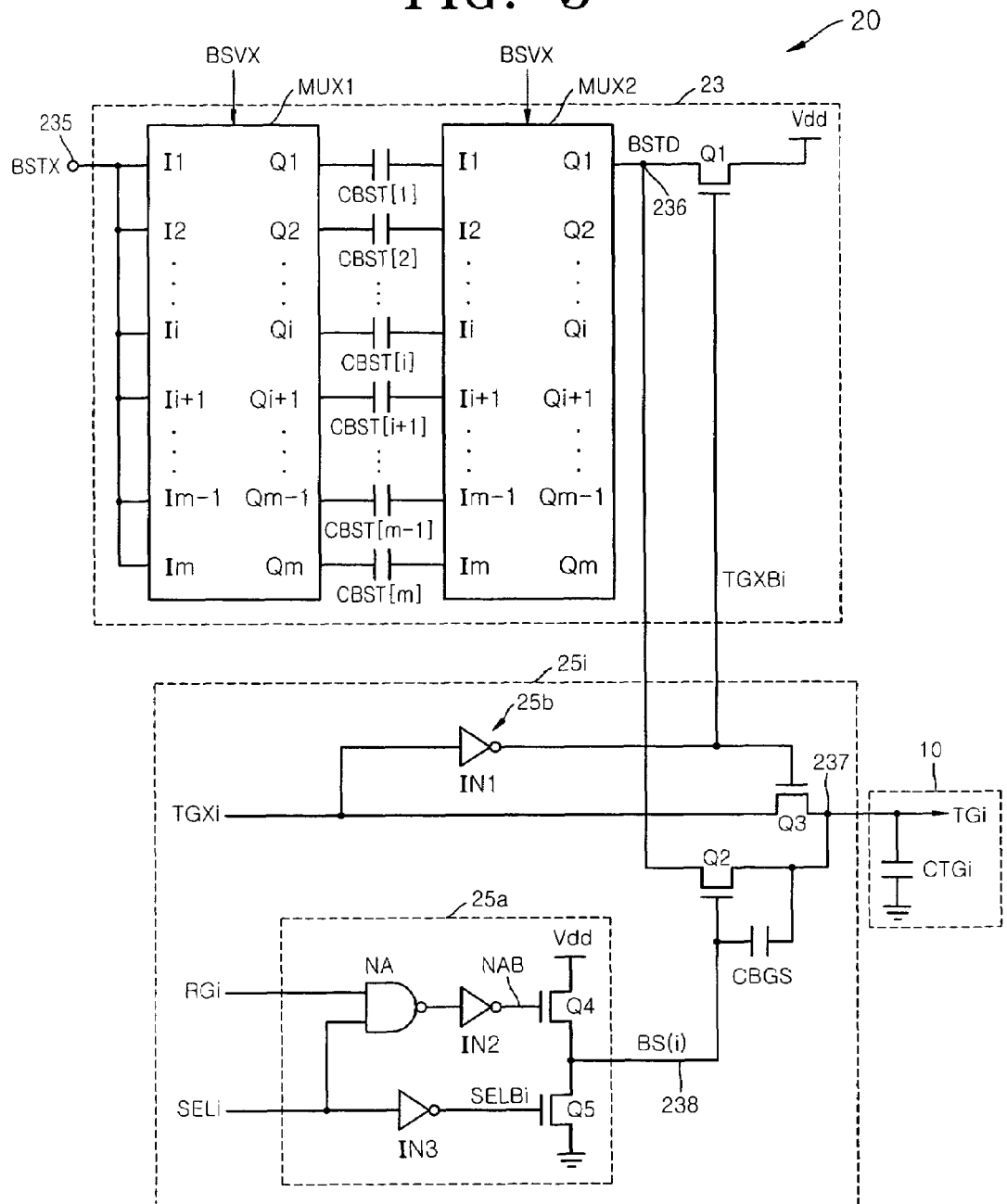
FIG. 5 is a circuit diagram illustrating a row driving unit according to another example embodiment of the present invention.

FIG. 5 is a circuit diagram illustrating the row driving unit 20 of FIG. 1 according to another example embodiment of the present invention. FIG. 5 further illustrates a circuit diagram of the boosting voltage controller 231 and the booster 233 of the variable booster 23 and the charge transfer signal transfer unit 25 in the row driving unit 20.

In the example embodiment of FIG. 5, for the sake of clarity, the charge transfer signal transfer unit 25 is illustrated only with the switch unit 25*i* applying the charge transfer driving signal TGi to the unit pixel arranged in the ith row among the plurality of the switch units 251 to 25*n*. However, it is understood that, while not illustrated in FIG. 5, one or more of the additional switch units 251 to 25*i*−1 and 25*i*+1 to 25*n* may be included with a structure and arrangement similar to the switch unit 25*i*.

In the example embodiments of FIGS. 3 through 5, referring to the boosting voltage controller 231 of the variable booster 23, the fourth switch 231a may include a first multiplexer MUX1 including input terminals I1 to Im being commonly connected to the node 235 and may further include output terminals Q1 to Qm connected to first ends of the capacitor group CBST[1] to CBST[m] of the boost capacitor 233a, respectively. The fifth switch 231b may include a second multiplexer MUX2 including input terminals I1 to Im connected to second ends of the capacitor group CBST[1] to CBST[m] of the boost capacitor 233a, respectively, and may further include output terminals Q1 to Qm being commonly connected to the node 236. In an example, the first switch SW1 of the booster 233 may include an NMOS transistor Q1 with a source and a drain connected to the node 236 and the external power voltage Vdd, respectively. In a further example, the NMOS transistor Q1 may be operated by the charge transfer execution bar signal TGXBi applied to a gate thereof.

In the example embodiment of FIG. 5, the switch unit 25*i* of the charge transfer signal transfer unit 25 may apply the charge transfer driving signal TGi to the charge transfer unit 102 in the unit pixel 100 arranged in the ith row of the pixel array 10. The second switch SW2[i], which may apply the charge transfer execution signal TGXi of the driving signal generator 21 as the charge transfer driving signal TGi, may include an NMOS transistor Q3 controlled by the charge transfer execution bar signal TGXBi applied to a gate thereof. The third switch SW3[i], which may apply the boosting voltage signal BSTD of the variable booster 23 as the charge transfer driving signal TGi, may include an NMOS transistor Q2 controlled by the charge transfer control signal BSi applied to a gate thereof.

In the example embodiment of FIG. 5, the switch unit 25*i* may further include a bootstrap capacitor CBGS connected to the gate and the source of the transistor Q2, a first logic unit 25*a* generating the charge transfer control signal BSi in order to control the transistor Q2, and a second logic unit 25*b* generating the charge transfer control signal (e.g., the charge transfer execution bar signal TGXBi) in order to control the transistor Q3. The second logic unit 25*b* may include a first inverter IN1 receiving the charge transfer execution signal TGXi as an input. The first logic unit 25*a* may include a NAND gate NA receiving the reset signal RGi and the pixel select signal SELi, a second inverter IN2 receiving an output signal of the NAND gate NA, and a third inverter IN3 receiving the pixel select signal SELi. The first logic unit 25*a* may further include NMOS transistors Q4 and Q5 connected to the external power voltage Vdd and a ground voltage, respectively, wherein the output signals NAB and SELBi of the second and third inverters IN2 and IN3 may be applied to gates of the NMOS transistors Q4 and Q5, respectively. In an example, the bootstrap capacitor CBGS may have a capacitance ranging from 0.001 to 0.1 pF.

Figure 6:
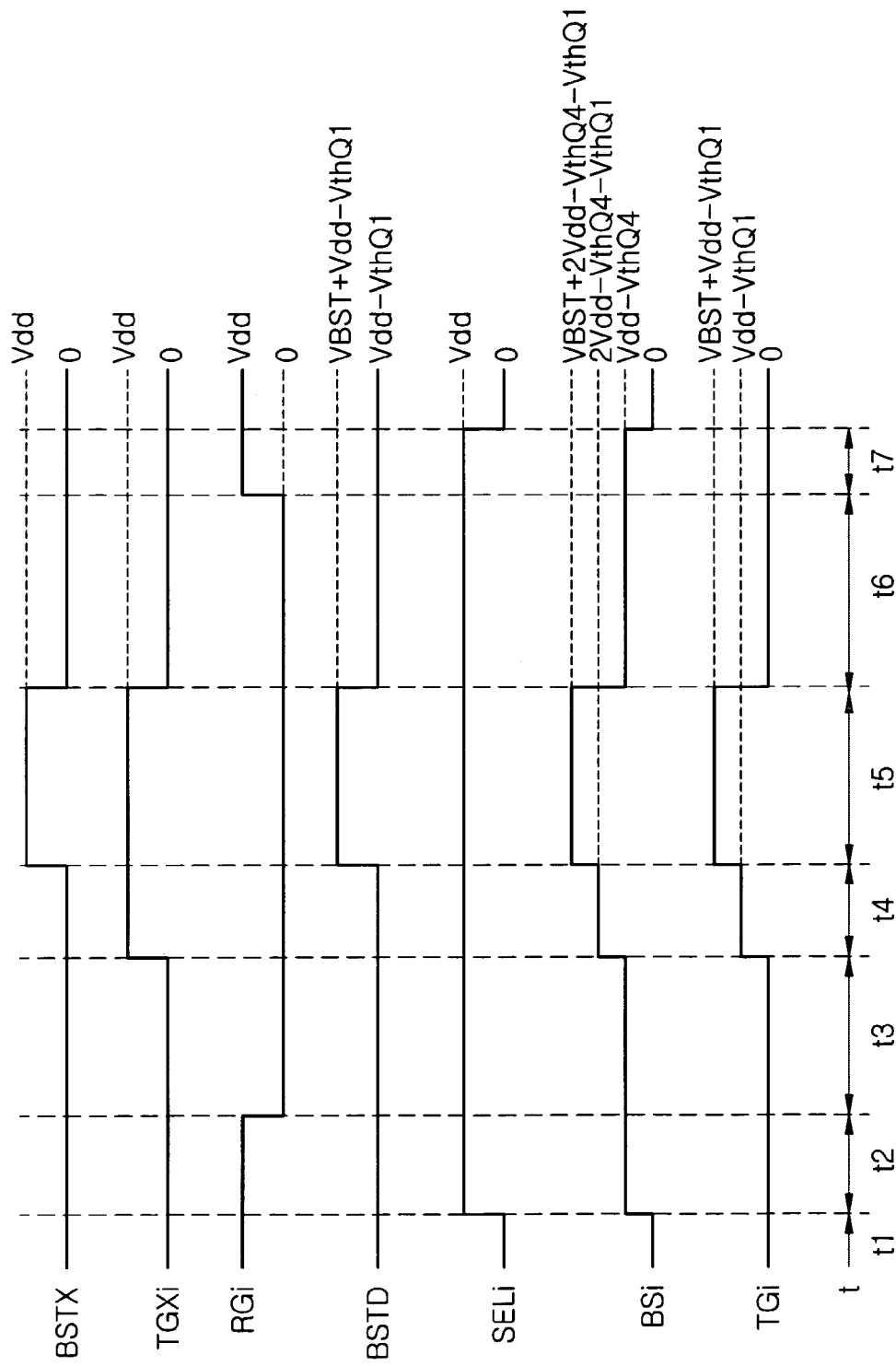
FIG. 6 is a waveform diagram illustrating an operation of the image sensor of FIG. 1 according to another example embodiment of the present invention.

FIG. 6 is a waveform diagram illustrating an operation of the image sensor of FIG. 1 according to another example embodiment of the present invention.

In the example embodiment of FIG. 6, during a period t1, the reset signal RGi may be set to a first voltage level (e.g., a higher voltage level or logic "1"), the pixel select signal SELi may be set to a second voltage level (e.g., a lower voltage level or logic "0"), and the charge transfer execution signal TGXi may be set to the second voltage level. The first transistor Q1 of the variable booster 23 may be turned on by the charge transfer execution bar signal TGXBi attaining the first voltage level (e.g., a higher voltage level or logic "1"). At the node 236, the boosting voltage signal BSTD may have a voltage level corresponding to a voltage difference Vdd-Vth(Q1) which may be calculated by subtracting a threshold voltage Vth of the first transistor Q1 from the external power voltage Vdd.

In the example embodiment of FIG. 6, during the period t1, the third inverter IN3 may output the select bar signal SELBi at the first voltage level and may transfer the select bar signal SELBi to a gate of the fifth transistor Q5. The second inverter IN2 may output an output signal NAB at the second voltage level and may transfer the output signal NAB to a gate of the fourth transistor Q4. Accordingly, the fourth transistor Q4 may be turned off and the fifth transistor may be turned on such that the charge transfer control signal BSi may be set to the ground voltage Vss (e.g., the second voltage level). The second transistor Q2 may be turned off in response to the charge transfer control signal BSi transitioning or being maintained at the second voltage level. The first inverter IN1 may apply the charge transfer execution bar signal TGXBi at the first voltage level to the gate of the third transistor Q3 to turn on the third transistor Q3. The third transistor Q3 may apply the charge transfer execution signal TGXi as the charge transfer driving signal TGi to the charge transfer unit 102 of the unit pixel 100 arranged in the ith row of the pixel array 10 by using the charge transfer execution bar signal TGXBi as the charge transfer control signal.

In the example embodiment of FIG. 6, during a period t2, if the pixel select signal SEL transitions to the first voltage level, the signal NAB may transition to the first voltage level and may be output through the second inverter IN2 so as to turn on the fourth transistor Q4. The pixel select bar signal SELBi may transition to the second voltage level and may be output through the third inverter IN3 to turn off the fifth transistor Q5 so that the voltage level of the node 238 may transition to a voltage level expressed by Vdd−Vth(Q4) which may be calculated by subtracting the threshold voltage Vth of the fourth transistor Q4 from the external power voltage Vdd. The charge transfer control signal BSi having the voltage level of Vdd−Vth(Q4) may be applied to the gate of the second transistor Q2. The charge transfer execution signal TGXi may be maintained at the second voltage level, and the first transistor Q1 may remain turned on such that the boosting voltage signal BSTD of the node 236 in the variable booster 23 may be maintained at the voltage level expressed by Vdd−Vth(Q1). Further, the third transistor Q3 may remain turned on by the charge transfer execution bar signal TGXBi set to the first voltage level, and the voltage level at a source of the second transistor Q2 may transition to the second voltage level (e.g., a lower voltage level such as 0 V) such that the charges corresponding to the voltage level expressed by Vdd−Vth(Q4) may be charged at the bootstrap capacitor CBGS connected to the gate and the source of the second transistor Q2.

In the example embodiment of FIG. 6, during the period t2, both the second and the third transistors Q2 and Q3 may be turned on in order to transfer the charge transfer driving signal TGi such that the charge transfer execution signal TGXi and the boosting voltage BSTD of the variable booster 23 may be applied as the charge transfer driving signal TGi to the pixel array 10. In an example, if both the second and the third transistors Q2 and Q3 include NMOS transistors, the third transistor Q3 may be configured with a larger magnitude than the second transistor Q2, wherein the magnitude may denote a ratio of a unit of width per unit of length in the transistor. Accordingly, while both the second and the third transistors Q2 and Q3 may be turned on, the boosting voltage signal BSTD transferred through the second transistor Q2 may have relatively little effect on the charge transfer driving signal TGi. The charge transfer execution signal TGXi may be applied from the driving signal generator 21 and may become a main signal and the boosting voltage signal BSTD of the variable booster 23 may become a sub-signal. The main signal and the sub-signal may applied (e.g., exclusively applied) as the charge transfer driving signal TGi of the pixel array 10.

In the example embodiment of FIG. 6, during a period t3, the reset signal RGi may transition to the second voltage level and the pixel select signal SELi and the charge transfer execution signal TGXi may be maintained at the first voltage level and the second voltage level, respectively. The output signals NAB and SELBi may transition to the second voltage level and may be applied to the gates of the fourth and the fifth transistors Q4 and Q5 such that the fourth and the fifth transistors Q4 and Q5 may be turned off and the node 238 may achieve a "floating" state. The second and the third transistors Q2 and Q3 may remain turned on. The charge transfer driving signal TGi may also maintain its voltage level from period t2 because the magnitude of the third transistor Q3 may be larger than that of the second transistor Q2.

In the example embodiment of FIG. 6, during a period t4, the charge transfer execution signal TGXi may transition to the first voltage level (e.g., a higher voltage level or logic "1"). The pixel select signal SELi and the reset signal RGi may remain at the first voltage level and the second voltage level, respectively. The charge transfer execution bar signal TGXBi may be applied to the gate of the first transistor Q1 through the first inverter IN1 at the second voltage level, and the first transistor Q1 may thereby be turned off. Furthermore, the charge transfer execution bar signal TGXBi may be applied to the gate of the third transistor Q3 in the switch unit 25i so as to turn off the third transistor Q3. The boosting voltage signal BSTD of the node 236 may have a voltage level which may be expressed as Vdd−Vth(Q1). The boosting voltage signal BSTD may be transferred to the node 237 through the on-state second transistor Q2 such that the charge transfer driving signal TGi may be transferred to the pixel array 10. The node 238 may remain in the floating state, and the voltage level of the node 238 may transition to a value which may be expressed as 2Vdd−Vth(Q4)−Vth(Q1).

In the example embodiment of FIG. 6, during a period t5, the charge transfer execution signal TGXi may remain at the first voltage level. The first transistor Q1 may be turned off by the charge transfer execution bar signal TGXBi set to the second voltage level and the node 236 may be set to the floating state. The boosting control signal BSTX may transition to the first voltage level so as to control the multiplexer MUX1 of the first switch 231a and the multiplexer MUX2 of the second switch 231b by an external boosting voltage variable control signal BSVX in accordance with a desired boosting voltage level. In an example, a single capacitor may be selectively connected to the node 235 and the node 236 from among the capacitor group CBST[1] to CBST[m] of the boost capacitor 233a.

In another example, referring to FIG. 6 during the period t5, if first to i-th capacitors CBST[1] to CBST[i] are selected in the boost capacitor 233a based on the desired boosting voltage level, a voltage level of the boosting voltage signal may be expressed as VBST(CBST[i])+Vdd−Vth(Q1). Thereafter, the boosting voltage signal BSTD of the node 236 may be applied to the node 237 through the on-state second transistor Q2 to the pixel array 10 as the charge transfer driving signal TGi. The node 238 may remain in the floating state and the charge transfer control signal BSi of the node 238 may achieve a voltage level which may be expressed as VBST(CBST[i])+2Vdd−Vth(Q4)−Vth(Q1).

In the example embodiment of FIG. 6, during the period t5, the denotation of VBST(CBST[i]) may be used to denote a boosted voltage based on the capacitance of the capacitors CBST[1] to CBST [i]. In a further example, the voltage level of the boosted voltage VBST may be determined based on a capacitance of capacitors selected from the boost capacitor group CBST[1] to CBST[m], the selection being configured to achieve the desired boosting voltage level. The boosted voltage VBST may vary based on the number of the selected boost capacitors. Accordingly, the boosting voltage signal BSTD at the node 236 may be controlled via the capacitor selection. In an example, if the capacitance of the boost capacitor is sufficiently higher than that of the load capacitor CTGi, the boosted voltage VBST may have a voltage level substantially equal to the external power voltage Vdd, as will be described later in greater detail with respect to Equations 1 and 2.

In the example embodiment of FIG. 6, during the period t5 as discussed above, the boosted voltage may be applied as the charge transfer driving signal TGi to the pixel array 10 through the node 236 without significant voltage loss by using the coupling capacitors CBGS connected to the gate and the source of the second transistor Q2 and the floating state of the node 238. If the boost capacitor 233a includes m number of capacitors connected to one another in parallel, the boosted voltage level may be adjusted by controlling the first multiplexer MUX1 and the second multiplexer MUX 2 with the external boosting voltage variable control signal BSVX.

In the example embodiment of FIG. 6, if the boost capacitor 233a includes m number of capacitors CBST[1] to CBST [m], a relationship between the boost capacitor 233a and the boosted voltage (e.g., a total capacitance and a total boosted voltage of the boost capacitor 233a) may be Equations 1 and 2, respectively, as expressed by $$CBST.total = CBST[1] + CBST[2] + \ldots + CBST[m-1] + CBST[m] \quad \text{Equation 1}$$

$$VBST.total = Vdd\{CBST.total/(CBST.total + CTG)\} \quad \text{Equation 2}$$

wherein CBST.total may denote the total capacitance and VBST.total may denote the total boosted voltage.

In the example embodiment of FIG. 6, during the period t5, assuming that the first to i-th capacitors CBST[1] to CBST[i] are selected among the m number of capacitors, the boost capacitance CBSTi-th may be expressed as $$CBSTi\text{-}th = (i/n) * CBST.total \quad \text{Equation 3}$$

and the boosted voltage VBSTi-th may be expressed as $$VBSTi\text{-}th = (i/n) * VBST.total \quad \text{Equation 4}$$

In the example embodiment of FIG. 6, during a period t6, the boosting control signal BSTX and the charge transfer execution signal TGXi may transition to the second voltage level. The first transistor Q1 may be turned on by the charge transfer execution bar signal TGXBi set to the first voltage level and the boosting voltage signal BSTD of the node 236 may transition to a voltage level which may be expressed as Vdd−Vth(Q1). The third transistor Q3 may be turned on and the electric potential of the node 237 may be set to the second voltage level (e.g., a lower voltage level such as 0 V) and the electric potential of the node 237 may be applied as the charge transfer driving signal TGi. The second transistor Q2 may also be turned on. The magnitude of the third transistor Q3 may be greater than that of the second transistor Q2. The charge transfer execution signal TGXi may thereby become a main signal. In an example, if the node 237 is set to a voltage level of 0 V, the voltage level of the charge transfer control signal BSi at the node 238 may transition to a voltage level expressed by Vdd−Vth(Q4).

In the example embodiment of FIG. 6, during a period t7, the reset signal RGi may transition to the first voltage level. The fourth transistor Q4 may be turned on such that the voltage level of the charge transfer control signal BSi at the node 238 may transition to a voltage level expressed by Vdd−Vth(Q4). The first transistor Q1 may be turned on by the charge transfer execution bar signal TGXBi set to the first voltage level. The boosting voltage signal BSTD of the node 236 may transition to a voltage level expressed by Vdd−Vth(Q1). The third transistor Q3 may be turned on and the electric potential of the node 237 may transition to the second voltage level (e.g., a lower voltage level such as 0 V). The electric potential of the node 237 may be applied as the charge transfer driving signal TGi.

In the example embodiment of FIG. 6, returning to the period t6, the boosting control signal BSTX and the charge transfer execution signal TGXi may not be simultaneously set to the second voltage level. The charge transfer execution signal TGXi may transition to the second voltage level after the boosting control signal BSTX transitions to the second voltage level. The charge transfer driving signal TGi may transition to a voltage level which may be expressed Vdd−Vth(Q1) from the previous voltage level (e.g., during period t5) of VBST+Vdd−Vth(Q1), and may thereafter transition to the second voltage level (e.g., a lower voltage level such as 0 V) during the period t6.

Figure 7:
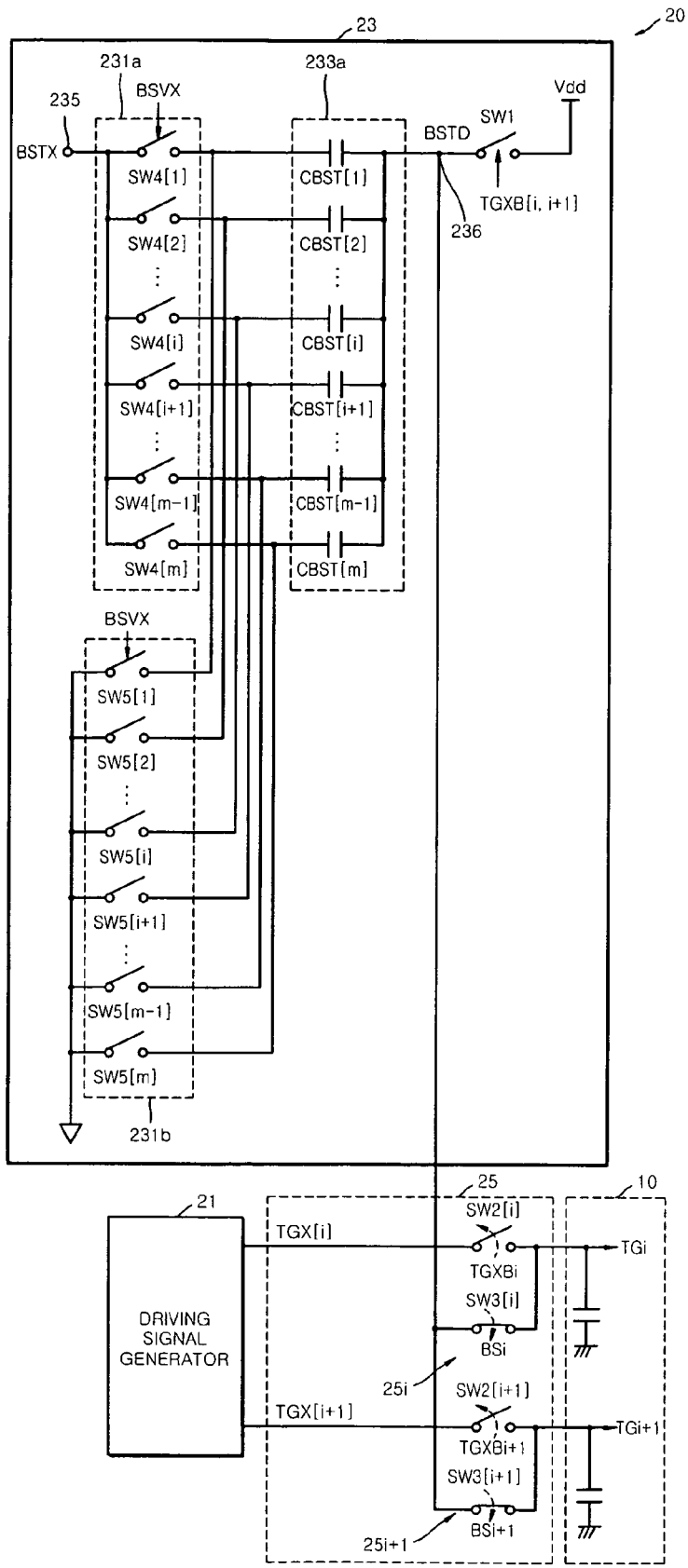
FIG. 7 is a circuit diagram illustrating a row driving unit according to another example embodiment of the present invention.

FIG. 7 is a circuit diagram illustrating the row driving unit 20 of FIG. 1 according to another example embodiment of the present invention. FIG. 7 further illustrates an ith switch unit 25i and an i+1th switch unit 25i+1 among the plurality of switch units 251 to 25n, wherein the ith switch unit 25i may apply the charge transfer driving signal TGi to the unit pixel 100 arranged in an ith row of the pixel array 10 and the i+1th switch unit 25i+1 may apply the charge transfer driving signal TGi+1 to the unit pixel 100 arranged in an i+1th row.

Figure 8:
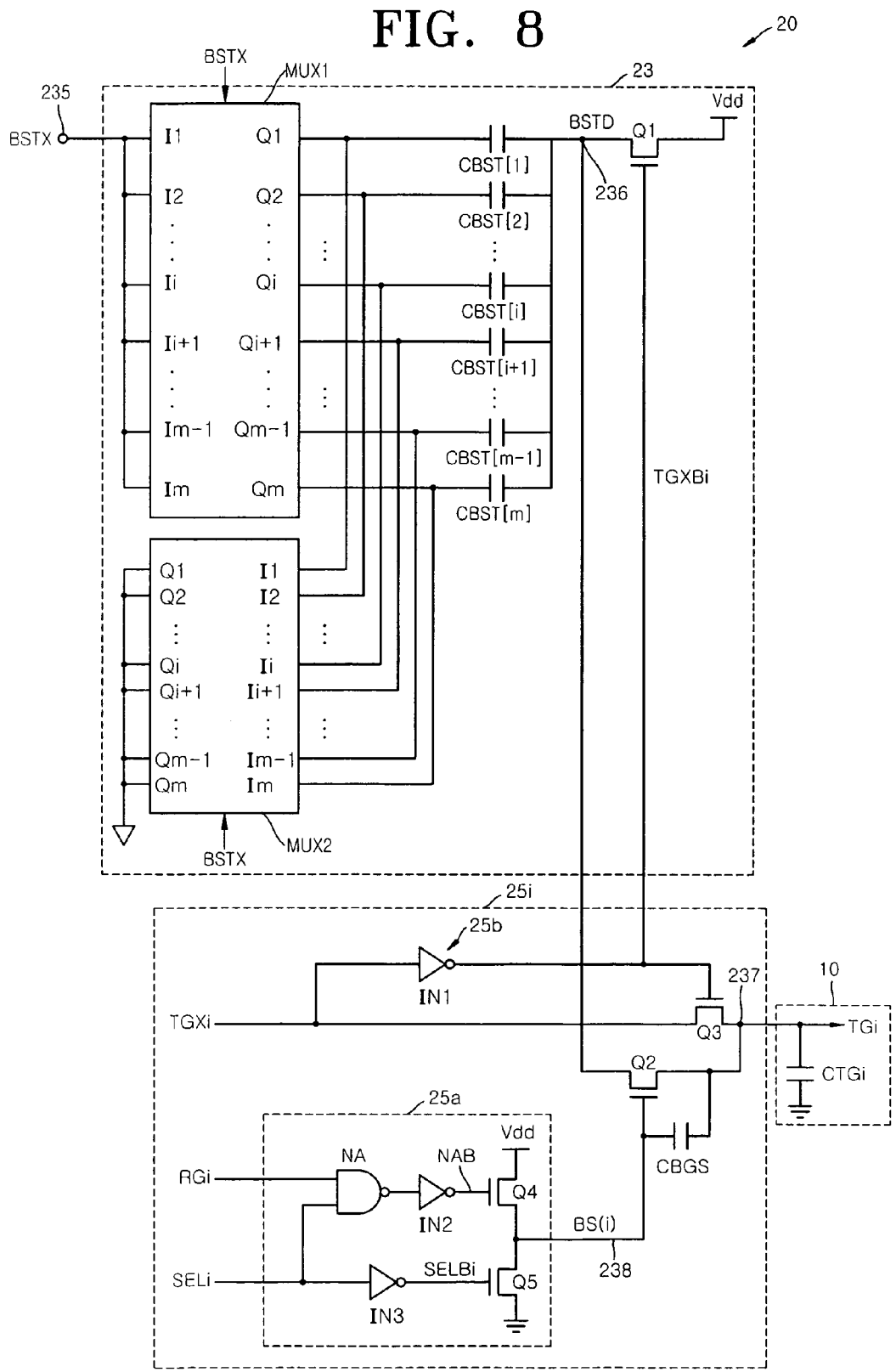
FIG. 8 is a circuit diagram of a row driving unit according to another example embodiment of the present invention.

FIG. 8 is a circuit diagram of the row driving unit 20 of FIG. 1 according to another example embodiment of the present invention. FIG. 8 further illustrates a detailed circuit diagram for the boosting voltage controller 231 and the booster 233 of the variable booster 23 in the row driving unit 20.

In the example embodiments of FIGS. 7, as discussed above with respect to the example embodiment of FIG. 4, the fourth switch 231a may include a switch group SW4[1] to SW4[m] connected to one another in parallel, disposed between the node 235 and the first ends of the boosting capacitor group CBST[1] to CBST[m]. However, the fifth switch 231b, which may include a switch group SW5[1] to SW5[m] connected to one another in parallel, may be disposed in parallel with the fourth switch 231a in the example embodiment of FIG. 7, as opposed to being configured in series with the fourth switch 231a as illustrated in FIG. 4.

In the example embodiments of FIGS. 7 and 8, the fourth switch 231a may be embodied as a first multiplexer MUX1 including input terminals I1 to Im commonly connected to the node 235 and output terminals Q1 to Qm connected to first ends of the capacitor group CBST[1] to CBST[m] of the boosting capacitor 233a. The fifth switch 231b may be embodied as a second multiplexer MUX2 including input terminals I1 to Im connected to the first ends of the capacitor group CBST[1] to CBST[m] of the boosting capacitor 233a and output terminals Q1 to Qm may be commonly connected to the ground voltage Vss.

In the example embodiments of FIGS. 7 and 8, the charge transfer signal transfer unit 25 may be the same as the charge signal transfer unit 25 of the example embodiments of FIGS. 4 and 5, and a further detailed description thereof has been omitted for the sake of brevity. Likewise, an operation of the row driving circuits 20 of FIGS. 7 and 8 may be identical to that of the waveform diagram illustrated in FIG. 6, and a further detailed description of the operation of the row driving circuits 20 of FIGS. 7 and 8 has been omitted for the sake of brevity.

In another example embodiment of the present invention, a boosted voltage (e.g., higher than an external power voltage) may be applied as a charge transfer driving signal to one or more unit pixels within a pixel array during a given time period, which may allow a higher amount of charges generated at an optoelectronic converter to be transferred to a charge detector. An afterimage effect (e.g., due to charges remaining in the optoelectronic converter) may thereby be reduced because of the increased charge transfer. Furthermore, a conversion gain and a charge accumulation capacity of the optoelectronic converter may be increased. In an example, the boosted voltage may be selectively set (e.g., by selectively deploying one or more of a plurality of capacitors) to attain a desired boosting voltage level.

Example embodiments of the present invention being thus described, it will be obvious that the same may be varied in many ways. For example, while the above-described example embodiments include references to the first and second voltage and/or logic levels, in one example the first logic level may refer to a higher logic level and the second logic level may refer to a lower logic level. Alternatively, in another example, the first logic level may refer to a lower logic level and the second logic level may refer to a higher logic level.

Such variations are not to be regarded as departure from the spirit and scope of example embodiments of the present invention, and all such modifications as would be obvious to one skilled in the art are intended to be included within the scope of the following claims.

What is claimed is:

1. An image sensor, comprising:
   a pixel array including a plurality of unit pixels, each of the plurality of unit pixels having a charge transfer unit for transferring charges accumulated in an optoelectronic converter to a charge detector via a charge transfer driving signal; and
   a row driving unit generating a boosted voltage, the boosted voltage set to a boosted voltage level higher than a power voltage level, the boosted voltage selectively boosted in response to a boosting voltage variable control signal, and selectively applying the charge transfer driving signal to the pixel array, wherein
   the row driving unit applies a charge transfer execution signal as the charge transfer driving signal to the pixel array in response to a charge transfer execution bar signal and applies the boosted voltage as the charge transfer driving signal to the pixel array in response to a charge transfer control signal, the charge transfer control signal generated in response to a reset signal and a pixel select signal.

2. The image sensor of claim 1, wherein the plurality of unit pixels are arranged as a matrix in the pixel array, the matrix including at least one row and at least one column.

3. The image sensor of claim 1, wherein the row driving unit includes:
   a driving signal generator generating the charge transfer execution signal;
   a variable booster generating the boosted voltage in response to the boosting voltage variable control signal; and
   a charge transfer signal transfer unit applying one of the boosted voltage and the charge transfer execution signal as the charge transfer driving signal to the pixel array.

4. The image sensor of claim 3, wherein the variable booster includes:
   a boost capacitor generating the boosted voltage by boosting up a voltage level at a node connected to a first end of the boost capacitor in response to a boost control signal, the boost capacitor including a plurality of capacitors connected to one another in parallel;
   a first switch applying a power voltage at the power voltage level and connected to the first end of the boost capacitor; and
   a boosting voltage controller for controlling the boosted voltage level of the boosted voltage and connected to the boost capacitor.

5. The image sensor of claim 4, wherein the first switch includes an n-type metal oxide semiconductor (NMOS) transistor with a gate receiving the charge transfer execution bar signal.

6. The image sensor of claim 4, wherein the plurality of capacitors in the boost capacitor have a first capacitance which is at least two times greater than a second capacitance of a load capacitor in the pixel array.

7. The image sensor of claim 6, wherein the plurality of capacitors in the boost capacitor each have substantially the same amount of capacitance.

8. The image sensor of claim 4, wherein the boosting voltage controller of the variable booster includes:
   a second switch connected to the first end of the boost capacitor; and
   a third switch connected to a second end of the boost capacitor,
   wherein the second and third switches selectively apply the boosting control signal to one of a plurality of capacitors based on a desired voltage level for the boosted voltage level and set the remaining capacitors of the plurality of capacitors to a floating state.

9. The image sensor of claim 8, wherein the second switch of the boosting voltage controller includes a multiplexer with input terminals receiving the boosting control signal and output terminals connected to a plurality of capacitors included within the boost capacitor.

10. The image sensor of claim 8, wherein the third switch of the boosting voltage controller includes a multiplexer with input terminals connected to a plurality of capacitors included within the boost capacitor and output terminals commonly connected to the first switch.

11. The image sensor of claim 4, wherein the boosting voltage controller of the variable booster includes:
    a second switch connected to the first end of the boost capacitor; and
    a third switch connected to the first end of the boost capacitor and a ground voltage,
    wherein the second and third switches selectively apply the boosting control signal to one of a plurality of capacitors based on a desired voltage level for the boosted voltage level and set the remaining capacitors of the plurality of capacitors to the ground voltage.

12. The image sensor of claim 11, wherein the second switch of the boosting voltage controller includes a first multiplexer with first input terminals receiving the boosting control signal and first output terminals connected to a plurality of capacitors included within the boost capacitor.

13. The image sensor of claim 12, wherein the third switch of the boosting voltage controller includes a second multiplexer with second input terminals connected to the plurality of the capacitors of the boost capacitor and the first output terminals of the first multiplexer, and second output terminals commonly connected to the ground voltage.

14. The image sensor of claim 3, wherein the charge transfer signal transfer unit includes a plurality of switches applying the charge transfer driving signal to at least one unit pixel arranged in each of a plurality of rows among the plurality of the unit pixels of the pixel array after receiving the charge transfer execution signal, the reset signal and the pixel select signal from the driving signal generator.

15. The image sensor of claim 14, wherein each of the plurality of switches includes:
    a first switch applying the charge transfer execution signal as the charge transfer driving signal to the pixel array in response to the charge transfer execution bar signal; and
    a second switch applying the boosted voltage as the charge transfer driving signal to the pixel array in response to the reset signal and the pixel select signal.

16. The image sensor of claim 15, further comprising:
    a first logic unit applying the charge transfer execution bar signal to the first switch as a first control signal for controlling a transfer of the charge transfer driving signal of the first switch after receiving the charge transfer execution signal; and
    a second logic unit applying a second control signal for controlling the transfer of the charge transfer driving signal to the second switch after receiving the reset signal and the pixel select signal.

17. The image sensor of claim 16, wherein the first switch includes a first NMOS transistor having a first gate receiving the charge transfer execution bar signal and the second switch includes a second NMOS transistor having a second gate receiving the second control signal applied from the second logic unit.

18. The image sensor of claim 17, wherein the first NMOS transistor has a larger magnitude than the second NMOS transistor, the magnitude being a ratio of a unit width per unit length in the first and second NMOS transistors.

19. The image sensor of claim 17, further comprising:
a bootstrap capacitor connected to the second gate and a source of the second NMOS transistor of the second switch.

20. The image sensor of claim 1, wherein the boosted voltage level may be set to one of a plurality of voltage levels.

21. A method of improving a charge transfer in an image device, comprising:
selectively adjusting a voltage level of a charge transfer driving voltage;
transferring the charge transfer driving voltage to a charge transfer unit for controlling an operation of the charge transfer unit; and
applying a charge transfer execution signal as the charge transfer driving signal to a pixel array in response to a charge transfer execution bar signal and applying the boosted voltage as the charge transfer driving signal to the pixel array in response to a charge transfer control signal, wherein the charge transfer control signal is generated in response to a reset signal and a pixel select signal.

22. The method of claim 21, wherein selectively adjusting the voltage level of the charge transfer driving voltage boosts the charge transfer driving voltage to a higher voltage level than an external power voltage level received by the charge transfer unit.

23. The method of claim 21, wherein selectively adjusting the voltage level of the charge transfer driving voltage is performed by selecting one or more of a plurality of capacitors.

24. The method of claim 23, wherein selecting higher numbers of the plurality of capacitor increases the voltage level of the charge transfer driving voltage.

* * * * *